Figure 4:
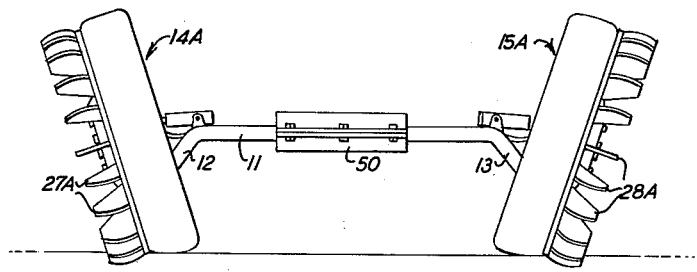

Dec. 26, 1961 C. VAN DER LELY 3,014,547
VEHICLE WHEEL TILTING ARRANGEMENT FOR UTILIZING DIFFERENT
WHEEL GROUND ENGAGING SURFACES
Filed Dec. 17, 1956 2 Sheets-Sheet 1
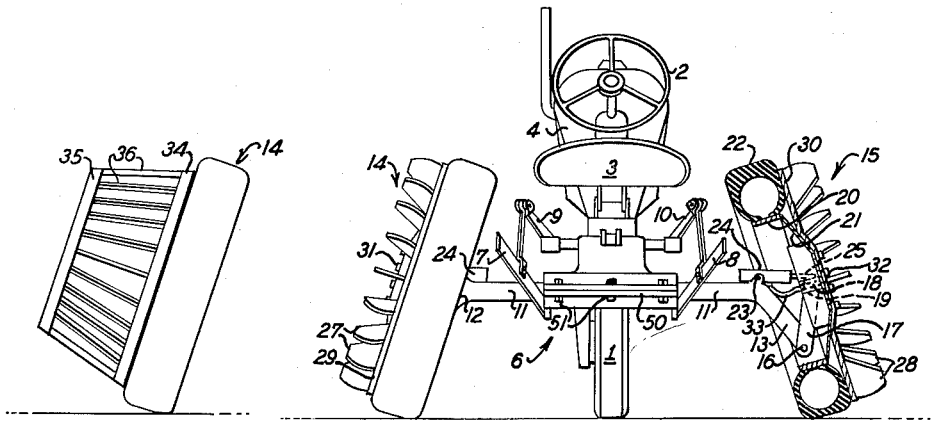
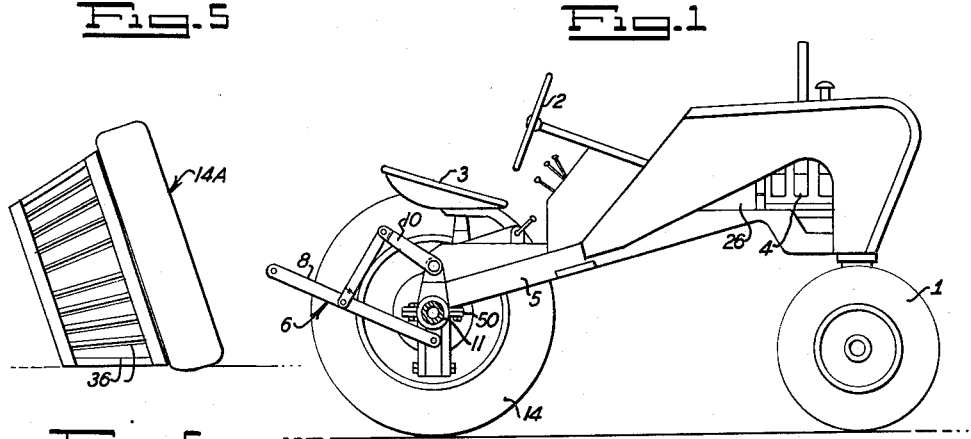
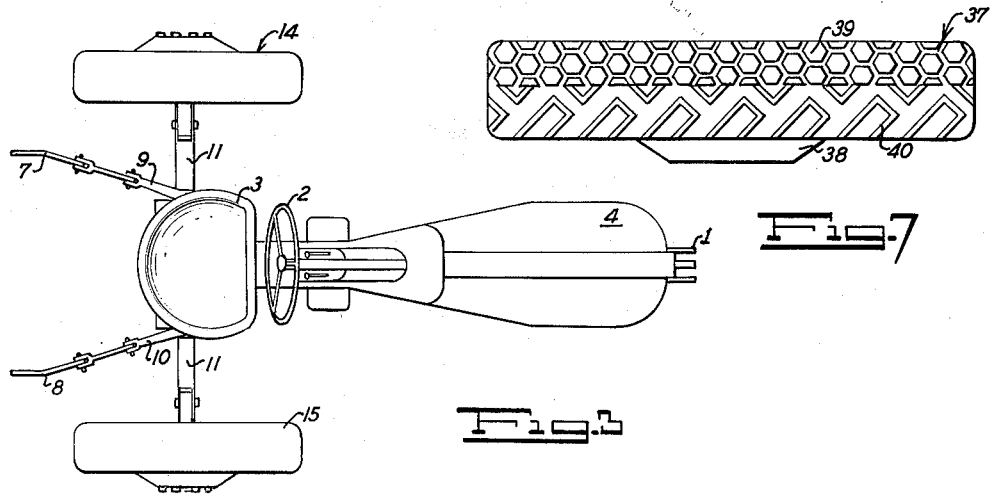

Dec. 26, 1961  C. VAN DER LELY  3,014,547
VEHICLE WHEEL TILTING ARRANGEMENT FOR UTILIZING DIFFERENT
WHEEL GROUND ENGAGING SURFACES
Filed Dec. 17, 1956  2 Sheets-Sheet 2

United States Patent Office 3,014,547
Patented Dec. 26, 1961

3,014,547
VEHICLE WHEEL TILTING ARRANGEMENT FOR UTILIZING DIFFERENT WHEEL GROUND ENGAGING SURFACES
Cornelis van der Lely, Maasland, Netherlands
(7 Bruschrain, Zug, Switzerland)
Filed Dec. 17, 1956, Ser. No. 628,786
Claims priority, application Netherlands Dec. 17, 1955
12 Claims. (Cl. 180—75)

The invention relates to mobile devices provided with running wheels, and more particularly to mobile devices having wheels with adjustable axles and skid preventing mechanisms.

Devices having running wheels with fixed axles are known to which auxiliary means may be connected in order to prevent the wheels from sinking into or slipping on the terrain traversed.

It is a deficiency of these known devices that the adding of these auxiliary means is too time consuming and it is an object of the invention to provide means to facilitate this operation.

In accordance with the invention, a device is provided having running wheels, the axis of rotation of at least one running wheel being adjustable but fixable in different positions in a vertical plane transverse to the travelling direction of the device. Moreover, the running wheel can be provided at its periphery with differently shaped surfaces or groups of surfaces adapted to contact the ground and arranged so that, in at least one position of the running wheel, only one surface or group of surfaces contacts the ground at one time.

The adjustment of the wheel axle is preferably effected by rotation about a hinge axis as will be described in detail. If an adjustment of the track gauge of the device is required, it is preferable that the hinge axis be situated higher than the axis of the wheel so that the distance between wheels can be adjusted within very wide limits.

Advantageously, the adjustment can be rapidly effected from the driver's seat of the device, this adjustment having special significance with regard to agricultural tractors for use in row culture.

Preferably, the hinge axis is situated in the wheel plane so that the height of the frame of the device remains substantially unchanged despite wheel adjustment.

For conditions wherein the device must be driven on soft ground or in any conditions requiring a very small pressure of the wheels on the ground, the invention contemplates the attaching of cage-shaped wheels to the running wheels. The provisions of the invention enable rendering the cage-shaped wheels either active or inactive in a very simple manner especially when the cage-shaped wheel has a conical form.

In accordance with further provisions of the invention, the hinge axle can be situated lower than the wheel axle. In this case, making the skid preventing members either active or inactive can be accomplished without the distance between wheels being substantially altered. The invention therefore provides for adjustably controlling the hinge axle position as desired, the hinge axle being preferably rotatable about a tumbler.

For the mounting of an auxiliary implement at one side of the device, the invention provides that the running wheels can be displaced laterally with regard to the device such as, for example, by a shifting of an axle connecting the running wheels to the frame.

Furthermore, to permit an adjustment in levels of the device, an adjustment of the wheel is contemplated whereby the wheel can be put in a position in which the wheel plane is located at a distance from the hinge axle. In this case, an adjustment of the wheel also causes a change in levels of the frame of the device.

Figure 8:
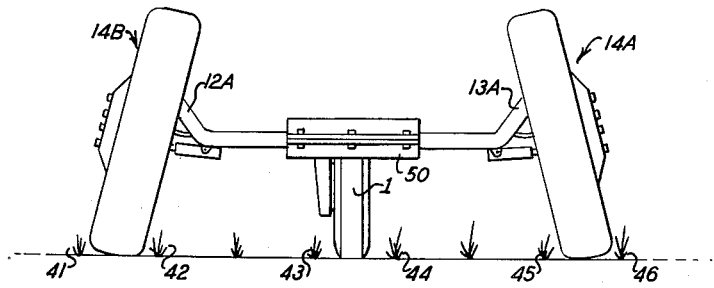
Figure 9:
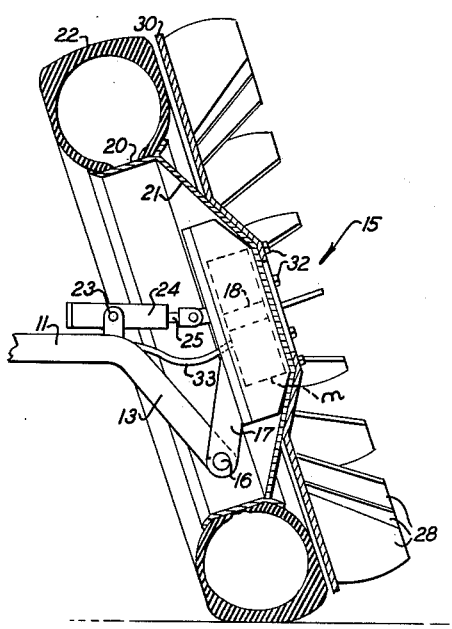
Figure 10:
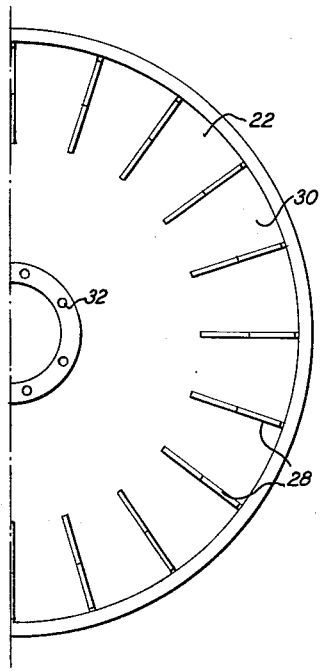

The invention will be more fully explained with reference to the accompanying drawing in which:

FIG. 1 is a rear elevational view of a tractor equipped in accordance with the invention, the rear wheels being provided with skid preventing members and the right rear wheel being shown in section, FIG. 2 shows a side elevational view of the same tractor with the right rear wheel omitted, FIG. 3 is a plan view of the tractor, the rear wheels not including skid preventing members, FIG. 4 shows a rear elevational view of a portion of the tractor of FIG. 1, the tractor having its wheels in different positions, FIG. 5 is a rear elevational view of a rear wheel of the tractor of FIG. 1, the view showing a cage-shaped wheel in a position in which this member is inactive, FIG. 6 is a rear elevational view of the wheel of FIG. 5 in a position in which the cage-shaped wheel is active, FIG. 7 shows, on a larger scale, a plan view of a wheel of the tractor of FIG. 1, the wheel being provided with a tire having a special profile, FIG. 8 is a rear elevational view of a portion of the tractor of FIG. 1 wherein is shown a different working position, FIG. 9 illustrates in enlarged scale, a tire of the tractor driven by a motor attached thereto, and FIG. 10 is a partial side view of the tire of FIG. 9, the tire being symmetrical about the central chain line shown in FIG. 10.

In FIGS. 1, 2 and 3, a tractor is provided with a front wheel 1 which by means of a steering wheel 2 can be governed in known manner by the driver seated on a seat 3. The motor 4 of the tractor is situated above the front wheel 1. The hindmost part 5 of the tractor is provided with a lifting device 6 comprising arms 7 and 8 which can be moved upwards and downwards by means of arms 9 and 10. The motor 4 supplies the power required for this movement. In the rearmost part 5 of the tractor is mounted a substantially cylindrical bar 11, the left end 12 and the right end 13 of which are bent downwards. These ends 12 and 13 carry the rear wheels 14—15 in a manner which will next be more fully described with reference to the wheel 15.

The extremity 13 carries a hinge axle or joint pin 16 about which the legs of a hinge axle fork 17 engage while enclosing the extremity 13. The fork 17 carries an axle 18 for the hub 19 which is connected to the rim 20 by a conical wheel disc 21. The rim 20 supports a tire 22. A hydraulic cylinder 24 is hingedly connected to the bar 11 by means of the protrusion 23. A plunger movable in the cylinder 24 is connected to the wheel axle 18 by the extension 25.

A liquid put under pressure by a pump 26, see FIG. 2, which is driven by means of the motor 4, controls the position of the plunger in the cylinder 24 by means of operating cocks and supply mains (not shown). The movement of the plunger controls the position of the wheel 15 by rotating the fork 17 about the pin 16.

It is desirable to change the wheel positions only during movement of the tractor. In FIG. 1, circles of skid preventing members 27 and 28 are mounted at the sides of wheels 14 and 15. The skid preventing members 27 and 28, respectively, are rigidly fixed to plates 29 and 30, respectively, which are detachably connected to the hubs of wheels 14 and 15, respectively, by means of bolts 31 and 32. Hydraulic motors (FIG. 9) are connected to the pump 26 via tubes, such as the flexible tube 33, and brakes are also incorporated in the hubs of the wheels.

The use of the tractor described is as follows. Normally, the tractor is operated with the wheels in vertical position and without the skid preventing members as shown in FIG. 3. If the tractor, however, must develop a tractive force for slippery terrain, the skid preventing members 27 and 28 are attached to the wheels 14 and 15. The wheels are then placed in position as shown in FIG. 1 subject to desired variation as controlled through the plungers in their respective pistons. When it becomes necessary to use the skid preventing members, the wheels 14 and 15 are moved hydraulically into positions 14A and 15A shown in FIG. 4. When this is done, the skid preventing members engage the ground in their new positions 27A and 28A, so that the tractor can develop a considerable tractive force or can exert a great braking force.

Instead of the skid preventing members 27 and 28, cage-shaped wheels 35 (see FIG. 5) can be connected by a large number of bars 36 to the tractor. These cage-shaped wheels are especially advantageous because the bars 36, when in contact with the ground, reduce the pressure exerted per unit area by the device on the ground. The bars 36 also provide a skid preventing function at the same time.

In FIG. 5, the cage-shaped wheel is in inactive position, whereas in the position shown in FIG. 6 the bars 36 are in contact with the ground. A first advantage of the conical shape of the cage-shaped wheel is that a sufficiently great distance to the ground can be imparted to the cage-shaped wheel while it is inactive. Secondly, a conical cage-shaped wheel is more suitable for receiving large forces than is a cylindric cage-shaped wheel.

A tire 37 (FIG. 7) can also be used for improved results, the running surface of this tire being divided into two substantially equal annular areas which lie side by side. These areas are provided with two different patterns 39 and 40. The pattern 39 consists of small blocks, whereas the pattern 40 is an oblique profile, the latter pattern being extremely suitable for operation in the field. The tire 37 is mounted in known manner on the rim which is connected to a wheel disc 38 which can be used in place of the wheel disc 21 of FIG. 1. By toppling the wheels outwardly or inwardly, one or the other wheel patterns can be used.

It will be evident that the skid preventing members and tire profile can be mounted toward the same side, such as the right side of the tires so that during the toppling action, the tires are controlled to remain in parallel planes.

In the device in FIG. 1, the bar 11 is fixed to the lower side of the hindmost portion 5 of the tractor by means of a support 50 which is attached to the portion 5 by bolts 51. The bar 11 is rotatable in the support 50 about its longitudinal axle and is lockable in any assumed position of rotation. With the wheels in locked position due to forces exerted at their circumferences, the hydraulic motors in the wheels can be caused to exert a driving force to cause the bar 11 to turn to the position shown in FIG. 8. The extremities 12 and 13 will then assume the positions 12A and 12B. This toppling of the wheels in reverse direction permits a considerable alteration of the gauge of the tractor because the axles of rotation of the wheel planes are thus situated at a relatively high level. This arrangement enables the driving of a tractor over terrain in which plants are provided in rows such as, for example, the rows 41–46, in FIG. 8. The wheels can be adjusted in accordance with the distances between rows.

While the device is used as described above, the wheels 14B and 15B may be provided with normal tires and it is of minor importance whether these wheels are driven or free wheeling.

If desired, the bar 11 can be mounted on the frame part 5 so as to be slidable in its longitudinal direction.

Though the invention is explained in detail for use with a tractor, it will be obvious that the invention may as well be used for other mobile devices propelled by their own or other motive power.

By modifying the tractor in such a manner that the hinge pin 16 is located outside the plane of the wheel 15, a device is obtained wherein a toppling of the wheel causes an adjustment in levels. It will be appreciated that it is also possible that each wheel is driven by its own motor, such as for example, an electromotor.

What I claim is:

1. A mobile device comprising a frame, a running wheel for supporting the frame, means positively driving said wheel, axle means on said frame including an axle rotatably supporting said running wheel normally in a vertical plane, and means for adjusting said axle so that said running wheel is rotatably supported in a plane angularly disposed with respect to the first said vertical plane, said running wheel being provided at its periphery with axially spaced ground engaging members arranged so that, in at least one position of the running wheel, only one of the members contacts the ground.

2. A mobile device comprising a frame, at least two running wheels supporting said frame, means positively driving said wheels, axle means on said frame rotatably supporting each of said running wheels normally in parallel vertical planes, and control means for adjusting said axle means so that said running wheels are rotatably supported in second planes angularly disposed with respect to each other and to said vertical planes, each said running wheel being provided at its periphery with differently shaped surfaces adapted to contact the ground and arranged so that, in at least one position of the running wheel, only one surface contacts the ground.

3. A device as claimed in claim 2 comprising tires on said wheels, said tires comprising adjacent peripheral portions of different tread constituting said surfaces, each portion being selectively brought into operating position by said control means controlling the angular disposition of said wheels.

4. A device as claimed in claim 2 wherein said axle means includes a wheel axle for each of said wheels and said control means comprises a hinge device intermediate each of said wheel axles and said frame, said hinge devices each including a hinge axle and each of said wheels being rotatably adjustable about said hinge axle relative to the frame.

5. A mobile device comprising a frame, at least two running wheels supporting said frame, axle means on said frame rotatably supporting each of said running wheels normally in parallel vertical planes, and control means for adjusting said axle means so that said running wheels are rotatably supported in second planes angularly disposed with respect to each other and to said vertical planes, each said running wheel being provided at its periphery with differently shaped surfaces adapted to contact the ground and arranged so that, in at least one position of the running wheel, only one surface contacts the ground, said device further comprising hydraulic motors mounted on said wheels for the driving thereof.

6. A mobile device comprising a frame, at least two running wheels supporting said frame, axle means on said frame rotatably supporting each of said running wheels normally in parallel vertical planes, and control means for adjusting said axle means so that said running wheels are rotatably supported in second planes angularly disposed with respect to each other and to said vertical planes, each said running wheel being provided at its periphery with differently shaped surfaces adapted to contact the ground and arranged so that, in at least one position of the running wheel, only one surface contacts the ground, and wherein said axle means includes a wheel axle for each of said wheels and said control means comprises a hinge device intermediate each of said wheel axles and said frame, said hinge devices each including a hinge axle and each of said wheels being rotatably adjustable about said hinge axle relative to the frame, said axle means further comprising a frame axle supported on said frame, end portions angularly connected to said frame axle and supporting said hinge axles, and bearing means supporting said frame axle for rotation about its axis.

7. A device as claimed in claim 6 comprising piston and cylinder means included in said control means and coupled to said frame axle and by said hinge devices to said wheel axles, and a controlled source of power coupled to said piston and cylinder means for controlling the positions of the wheels.

8. A device as claimed in claim 6 wherein said hinge axles are positioned in the plane of said wheels.

9. A device as claimed in claim 6 comprising ground engaging means detachably coupled to the outer sides of said wheels.

10. A device as claimed in claim 9 wherein said ground engaging mean comprises circularly positioned, radially disposed blades.

11. A device as claimed in claim 9 wherein said ground engaging means comprises a cylindrical cage of bars.

12. A device as claimed in claim 9 wherein said ground engaging means comprises a frusto-conical cage of bars.

References Cited in the file of this patent

UNITED STATES PATENTS

| | | |
|---|---|---|
| 298,008 | Manuel | May 6, 1884 |
| 829,605 | Ridings | Aug. 28, 1906 |
| 1,608,077 | Wieser | Nov. 23, 1926 |
| 1,868,648 | Wells et al. | July 26, 1932 |
| 2,104,532 | Sommer | Jan. 4, 1938 |
| 2,207,780 | Brown | July 16, 1940 |
| 2,282,753 | Arndt | May 12, 1942 |
| 2,432,107 | Williams | Dec. 7, 1947 |
| 2,494,324 | Wright | Jan. 10, 1950 |
| 2,625,232 | Lado | Jan. 13, 1953 |
| 2,631,863 | Tranter et al. | Mar. 17, 1953 |
| 2,678,106 | Vonderheide | May 11, 1954 |
| 2,812,031 | Aghnides | Nov. 5, 1957 |

FOREIGN PATENTS

| | | |
|---|---|---|
| 1,084,034 | France | June 30, 1954 |